UNITED STATES PATENT OFFICE.

HILAND G. HULBURD, OF PLACERVILLE, CALIFORNIA.

PROCESS FOR PRESERVING EVAPORATED FRUITS AND VEGETABLES.

SPECIFICATION forming part of Letters Patent No. 228,198, dated June 1, 1880.

Application filed November 10, 1879.

*To all whom it may concern:*

Be it known that I, HILAND G. HULBURD, of Placerville, El Dorado county, State of California, have invented an Improved Process for the Preservation of Evaporated Fruits and Vegetables; and I do hereby declare that the following is a full, clear, and exact description.

A common method of preparing and preserving fruits and vegetables for table use is to desiccate or dry and pack them in bulk. Dried or desiccated fruits and vegetables, however, not only lose their flavor and fresh crisp nature by long keeping in this way, but are liable to become infested with insect life, in which condition they are called "wormy."

My invention relates to a method or process for putting up this class of fruits and vegetables by which they may not only be kept for years in a moist and fresh condition, but are completely protected from the ravages of insects.

After the fruits or vegetables have been dried in the usual way I moisten them with water, if moisture is required, to render them pliable and in a proper condition to be packed, and then press them into a can or tight vessel and seal them up. The can and contents are then heated by steam, immersion in boiling water, or by other means sufficient to highly expand the air which is contained within the can. After being thoroughly heated the cans are taken out and a hole is made in them to allow the confined air to escape. A vent may be left open during the process of heating; but the former method is preferable.

While the can and contents are still highly heated the vent-hole is closed or sealed, so that if the can is perfect it is air-tight and nearly all the air is excluded.

By this means fruits or vegetables which have been condensed by evaporation can be effectually preserved from mold, decay, or the ravages of insects for an indefinite period.

While it is commonly known and practiced to preserve cooked fruits and vegetables in fluids by the application of heat and the exclusion of air, also to preserve fruits and vegetables that have been dried or evaporated from insects by sealing in air-tight packages without additional moisture and the exclusion of air, the above-described process enables me to add a larger per cent. of moisture to the substance treated without fear of mold or decay than can be obtained by the ordinary process, thus keeping the substance in a fresh and proper condition.

Having thus described my invention, what I claim, and desire to secure by Letters Patent, is—

The process of adding moisture to dried fruits and vegetables, and then hermetically sealing them in air-tight vessels after the air has been expelled by heat, substantially as above specified.

In witness whereof I have hereunto set my hand and seal.

HILAND GEORGE HULBURD. [L. S.]

Witnesses:
W. F. CLARK,
EDWARD E. OSBORN.